United States Patent [19]
Good et al.

[11] Patent Number: 5,185,561
[45] Date of Patent: Feb. 9, 1993

[54] TORQUE MOTOR AS A TACTILE FEEDBACK DEVICE IN A COMPUTER SYSTEM

[75] Inventors: Michael D. Good, Arlington, Mass.; James B. Munson, Colorado Springs, Colo.

[73] Assignee: Digital Equipment Corporation, Maynard, Mass.

[21] Appl. No.: 734,479

[22] Filed: Jul. 23, 1991

[51] Int. Cl.$^5$ .............................. H02P 7/00
[52] U.S. Cl. ............................ 318/432; 340/706; 434/45
[58] Field of Search .............. 414/4, 5, 7; 340/706, 340/707, 710, 712, 672, 686; 434/234, 45, 217; 318/432, 568.17

[56] References Cited

U.S. PATENT DOCUMENTS

| | | | |
|---|---|---|---|
| 4,302,138 | 11/1981 | Zarudiansky . | |
| 4,604,016 | 8/1986 | Joyce . | |
| 4,661,032 | 4/1987 | Arai . | |
| 4,712,101 | 12/1987 | Culver . | |
| 4,823,634 | 4/1989 | Culver . | |
| 4,893,981 | 1/1990 | Yoshinada et al. | 414/5 |
| 4,896,554 | 1/1990 | Culver . | |
| 4,928,093 | 5/1990 | Rahman . | |
| 4,931,018 | 6/1990 | Herbst et al. | 434/234 |
| 4,956,790 | 9/1990 | Tsuchihashi et al. | 414/5 X |
| 4,975,546 | 12/1990 | Craig . | |
| 5,072,361 | 12/1992 | Davis et al. | 318/568.17 |

OTHER PUBLICATIONS

"Through the looking glass into an artificial world—via computer" by Doug Stewart, Smithsonian, Jan. 1991, pp. 36-45.

"Interfaces for Advanced Computing" by James D. Foley, Scientific American, Oct. 1987, pp. 127-135.

"Feeling and Seeing: Issues in Force Display" by Margaret Minsky et al., Computer Graphics, Mar. 1990, pp. 235-243.

"Project GROPE-Haptic Displays for Scientific Visualization" by Frederick P. Brooks, Jr. et al., Computer Graphics, vol. 24, No. 4, Aug. 1990, pp. 177-185.

"A Hand Gesture Interface Device" by Thomas G. Zimmermann et al., *Proceedings CHI+GI 1987 Human Factors and Computing Systems and Graphics Interface (Toronto, ON, Apr. 5-9, 1987), pp. 189-192.*

"Artificial Reality with Force-Feedback: Development of Desktop Virtual Space with Compact Master Manipulator" by Hiroo Iwata, *Computer Graphics*, vol. 24, No. 4, Aug. 1990, pp. 165-170.

"Recent Progress Creating Environments with the Sense of Feel: Giving 'Look and Feel' Its Missing Meaning" by Margaret Minsky et al., Proceedings CHI '89 Human Factors and Computing Systems (Austin, TX, Apr. 30-May 4, 1989).

*Primary Examiner*—A. Jonathan Wysocki
*Attorney, Agent, or Firm*—Ronald E. Myrick; Barry N. Young; Ronald C. Hudgens

[57] ABSTRACT

A hand held, one dimensional, torque feedback device is used to feel and manipulate computer generated visual information and associated torque forces. In the preferred embodiment, molecular bond data is manipulated in a virtual reality system. The device can also be used with a workstation generated display on a plurality of problems which generate torque.

31 Claims, 5 Drawing Sheets

TORQUE MOTOR AS A TACTILE FEEDBACK DEVICE IN A COMPUTER SYSTEM

BACKGROUND OF THE INVENTION

Virtual reality, cyberspace or presence—the technology that enables people to see, hear, feel, and walk around a computer generated world has captured the imagination of the public. For example, with tactile feedback devices at the fingertips, data gloves which present positioning information and a head mounted display may provide a realistic visual image which facilitates the interpretation of computer generated information. These images operate in accordance with predetermined modelling rules which can represent any physical system, real or imagined. Abstract systems imagined as physical systems, as well as real life physical systems, can be simulated. For example, the directories and files on a computer can be represented as interconnected objects. With this technology, the user can interact with the computer generated images in much the same way that he interacts with the real world.

SUMMARY OF THE INVENTION

The claimed invention is drawn to a computer input device comprising a motor in a hand held housing and a shaft extending from the motor to be rotated by hand and to provide torque to a user's hand. A position indicator provides an output to a computer indicating the shaft rotational position and an input to the motor controls the torque applied to the shaft by the motor from a computer output. Thus, torque on the hand, not just pressure on the fingers, can be applied. A disabling button may be provided on the shaft to disable the motor output.

A controller connects the device to a computer system. The controller may comprise circuitry for generating an output including the position signal and a timing signal, circuitry adapted to transmit the position and timing data to the computer and to receive a digital tactile signal from the computer, a digital to analog converter for processing the tactile signal, and an amplifier for coupling the tactile torque feedback signal to the torque motor. The computer can process the position and timing signals to generate signals representing the velocity and acceleration of the shaft.

The computer input device and controller of the invention can be used in a general purpose computer system. For example, a computer can be used to store and manipulate visual and tactile data. The visual data can be displayed and a portion of the visual data selected and manipulated by the device. Torque resulting from the manipulation provide the user with a tactile torque feedback. The tactile torque feedback signal can represent a gradient.

Since the computer interface device is a hand held, portable unit, the user can figuratively walk around a "virtual reality" with it. This makes a computer generated display much more accessible and useful. Because the device is hand held and releasable, it is much safer than conventional force feedback devices. A large torque produced on the shaft will not injure the hand. However, the computer interface device of the invention can also be manipulated by the disabled by using a prosthetic device or a body part other than the hand.

In the preferred embodiment, the system simulates molecular bond data by means of a computer which stores molecular bond format data, such as protein data-bank format data, and generates visual and tactile torque feedback information for a given molecular bond. The computer generated visual information can be transmitted to a display device for displaying the molecular bond information. A positioning device connected to the computer generates spatial information regarding the molecular bonds so that a particular molecular bond can be selected for manipulation. A torque feedback device is connected to the computer for manipulating a particular molecular bond and transmitting tactile information concerning the bond to the user. Thus, the user holds the device in his hands so that a particular molecular bond can be manipulated and the torque of the resultant molecular forces can be felt, as well as seen, by the user.

The above and other features of the invention including various novel details of construction and combination of parts will now be particularly described with reference to the accompanying drawings and pointed out in the claims. It will be understood that the particular device embodying the invention is shown by way of illustration only and not as a limitation of the invention. The principles and features of this invention may be employed in varied and numerous embodiments without departing from the scope of the invention.

DETAILED DESCRIPTION OF THE INVENTION

Presence is the attribute of computer systems which lets users concentrate on their work, rather than the use of the computer by providing visual and tactile feedback. New computer input and output technologies have the potential to increase presence by making greater use of the senses of vision and touch in the use of computer systems. For example, presence technology can be used by oil company geologists who want to "fly through the earth" and see where to drill for oil. The virtual reality system allows a geologist to feel the hardness and the softness of the earth and to see the corresponding strata.

Figure 1:
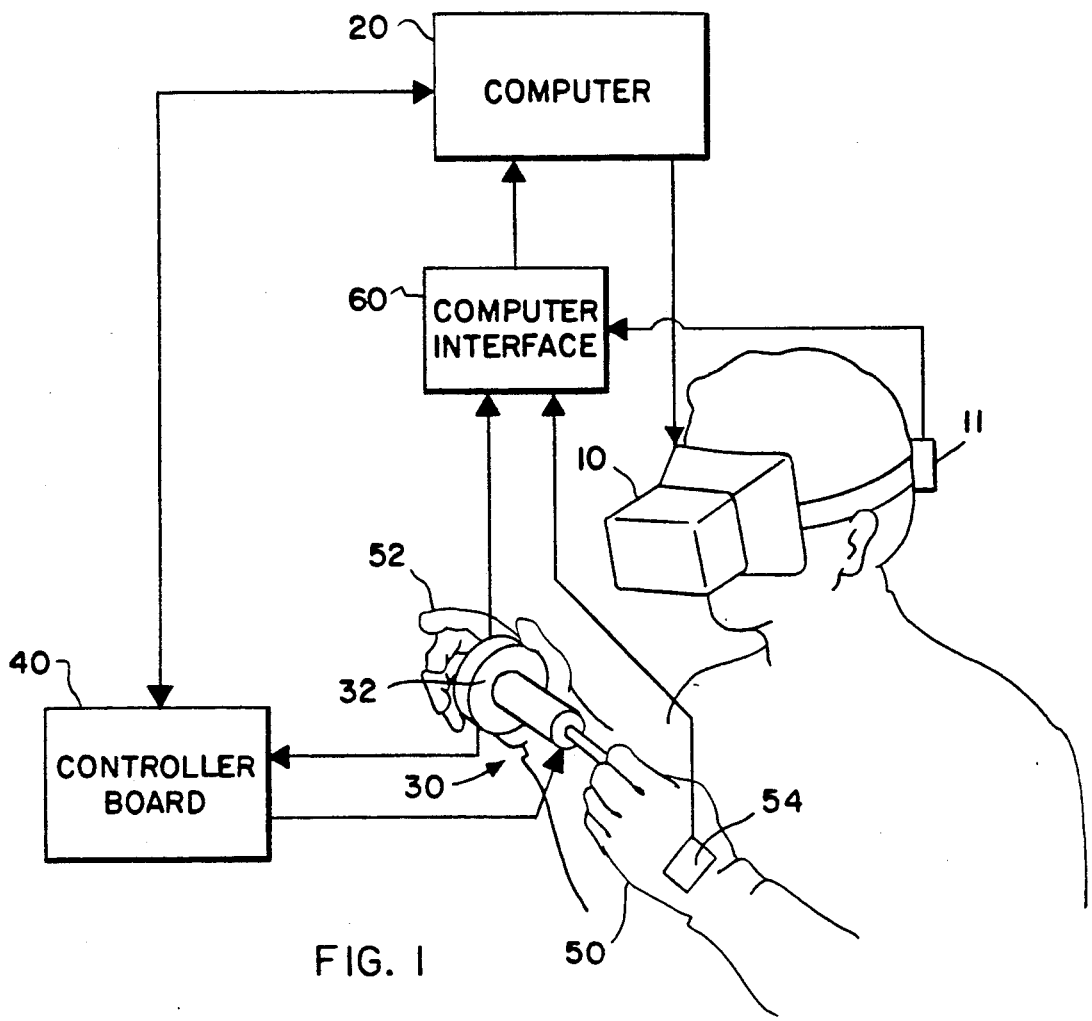
FIG. 1 illustrates a general purpose computer system which uses the portable, one dimensional, torque feedback computer interface device of the invention.
Figure 2:
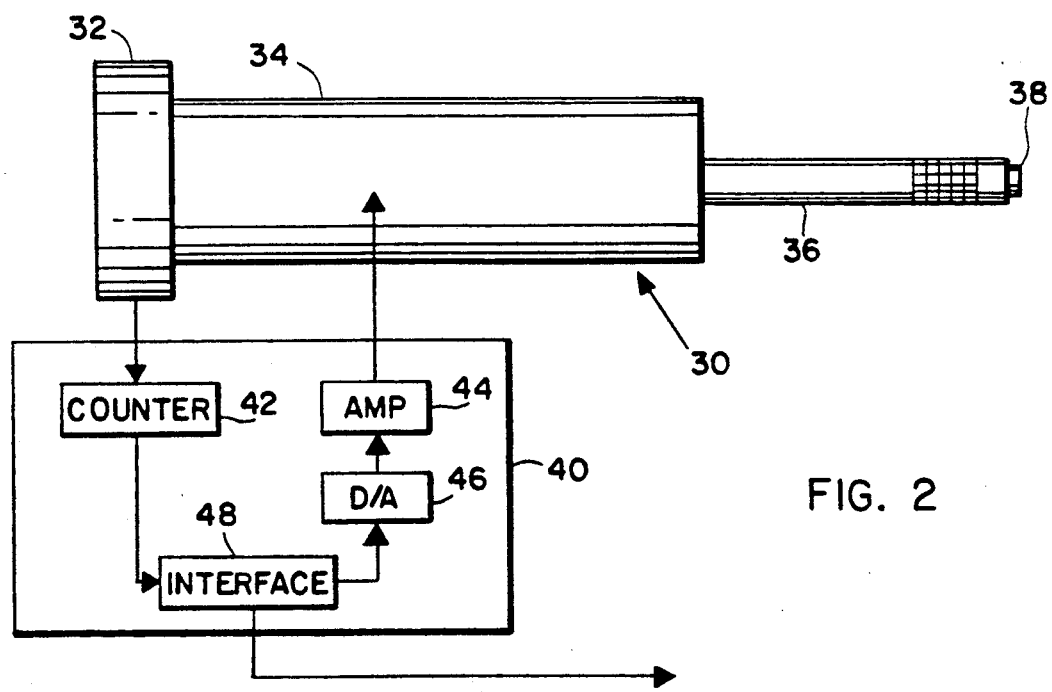
FIG. 2 illustrates the details of the portable, one dimensional, torque feedback computer interface device of the invention and its associated controller board.

FIGS. 1 and 2 illustrate the use of the torque feedback computer interface device of the invention in a multipurpose computer environment. Computer 20 can represent a conventional workstation with a conventional monitor and keyboard, but it is shown in a virtual reality system. The user in FIG. 1 is shown wearing a head mounted monitor 10 with a position and orientation sensor 11 and gloves that track hand and finger movements. Gloves 50 and 52 have cables sandwiched between two layers of cloth which run the length of each finger and thumb. Thus, the flex of each finger can be tracked. Position detector 54, mounted on glove 50, provides data regarding the location of the hand. A similar device is located on glove 52. Thus, six degrees of position manipulation information are transmitted from gloves 50 and 52 to computer interface 60, which transmits the position data to computer 20. Navigation data from sensor 11 is transmitted to computer interface 60 which relays the information to computer 20. Thus, the user gains the illusion of navigating around a computer generated image. By moving his hands and fingers, the user can select points on the computer visual image to be manipulated.

FIG. 1 shows the user holding the computer interface device 30 of the invention. As shown in FIG. 2, the computer interface device is comprised of a rotary position indicator 32, a torque motor 34, a shaft 36 with a knurled end coupled to the torque motor, and a disabling switch 38 mounted at the end of the shaft 36. Knobs or wheels can be attached to the end of shaft 36 to improve the grip. A torque motor is designed to provide near maximum torque under the condition of "stall" or "locked-rotor", and the motor is capable of remaining in a stalled condition for prolonged periods. As the user twists shaft 36, changes in the rotary position of the shaft are transmitted to controller board 40 and relayed to computer 20. Position detector 54 can be mounted on computer interface device 30, rather than on gloves 50 and 52. Also, the computer interface device 30 can be manipulated by the disabled by using a prosthetic device or a body part other than the hands.

In the preferred embodiment, the rotary position indicator 32 is a quadrature encoder which provides an indication of the magnitude and direction of the movement. The typical quadrature encoder includes two optical gratings which are phase shifted 90°. The magnitude and direction of the position can be determined by counting and comparing pulses from the respective gratings. However, any type of encoder which transmits position and direction information may be used. The digital signal from rotary position indicator 32 is transmitted to counter circuit 42 of controller board 40. Counter circuit 42 develops an output including the position signal and a timing signal. The frequency of the timing signal can be varied. The position and timing signals are transmitted to the computer by way of interface circuit 48. Computer 20 processes the position and timing data from computer interface device 30 in accordance with a set of predetermined rules relevant to the specific application being applied. The computer also generates signals which represent the velocity and acceleration of the shaft. However, the controller board 40 can be modified to perform the calculations for velocity and acceleration of the shaft.

The amount of tactile torque feedback associated with the position, velocity, and acceleration information processed by the computer is relayed back to torque motor 34 from computer 20. Interface circuit 48 receives the digital tactile torque signal from computer 20 and transmits that signal to digital to analog converter 46. The analog signal generated by converter 46 is amplified by servo amplifier 44. The voltage or current signal from servo amplifier 44 is transmitted to the torque motor 34 of computer interface device 30 to produce a resultant tactile feedback signal to the user holding the shaft 36. The user may disable this tactile torque feedback by pressing button 38. Thus, the computer generated model visual display may be further manipulated without hindrance by the associated torque forces.

The simplicity of the computer interface device permits it to be used in many diverse applications. Its portability allows it to be held between the user's hands and to convey virtual reality adjustments as the hands move to different positions in space. The tactile torque feedback information transmitted to the user provides safe, intuitive information concerning the computer generated visual model. If excessive torques are generated for a given position, the hand held shaft will spin freely without damaging the individual.

The computer interface device of the invention can be used in a plurality of different applications. For example, as noted previously, it could also be used by geologists to simulate the look and feel of the earth's crust in the search for oil. It could be used by industrial designers to produce the most ergonomic, user friendly design for an appliance. In a similar context, toy designers can use the computer interface device of the invention to manipulate a computer generated visual model of a desired toy to determine its efficacy. However, the preferred embodiment of the invention is used in molecular modelling. A specific application is in determining enzyme docking. As noted above, by presenting the user, the biochemist in this instance, with tactile, as well as visual, representations of the molecular bonds, insightful interpretations of molecular interactions can be determined.

In a molecular modelling context, the user selects the molecule to be studied, and the data for that molecule is read into the computer by using a protein data bank (PDB) format. The Brookhaven Protein Data Bank (PDB) format is a standard data file format used to describe molecules for use with molecular modelling software. It is used to describe both the enzyme and enzyme inhibitor molecules involved in enzyme docking problems. PDB format is used by many different software packages, including Stardent's Application Visualization System (AVS) and Columbia University's MacroModel software. PDB format provides a listing of the atoms in a molecule and their Cartesian coordinates. It can also include information about the charge of the atom and the other atoms in the molecule to which it is bonded, and the types of bonds (e.g., single or double bonds). The molecules can be displayed in a window on a display screen in a color coded format. This provides an electronic version of the mechanical Dreiding stick and ball models that chemists use to physically model a molecule. As will be explained, the electronic model can be physically manipulated like the mechanical model while providing other quantitative data regarding molecular bonds not available with the mechanical models. By using the gloves 50 and 52 of the virtual reality system of FIG. 1 or using a conventional keyboard or mouse, a user can select any bond in the molecule. The user then rotates around that bond with the computer input device of the invention.

A typical use for such molecular manipulation is drug docking. A large enzyme model is typically presented in the computer display bank. In the drug docking process, an enzyme which causes some harmful effect to the body is deactivated. This process of deactivation is achieved by docking smaller inhibitor drug molecules at the active receptor sites of the larger enzyme molecules. As part of this process, the molecular bonds are manipulated. First, the bonds within a molecule may be manipulated. Then, the drug molecule may be manipulated relative to the enzyme molecule.

Figure 3:
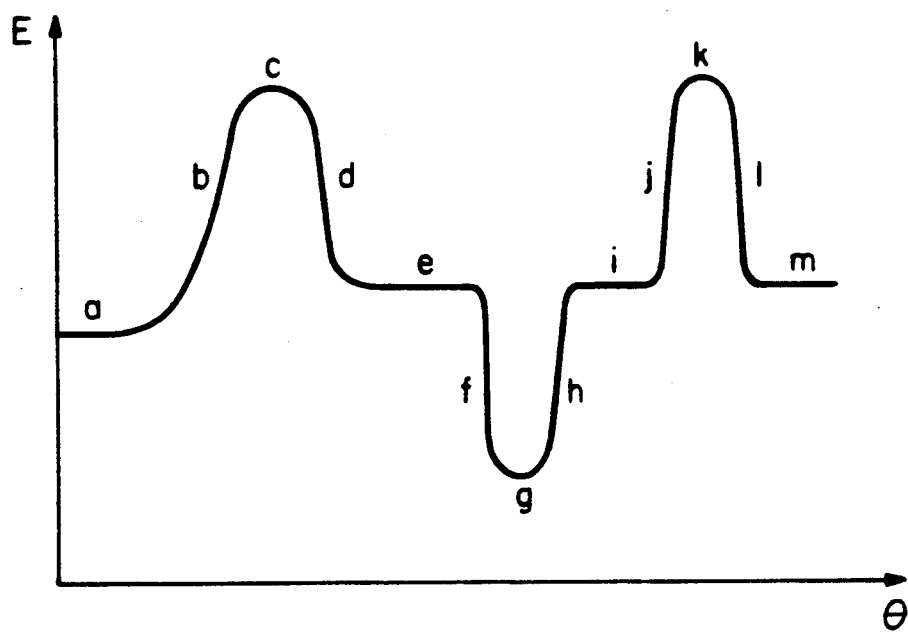
FIG. 3 illustrates the energy forces at a particular molecular bond.
Figure 4:
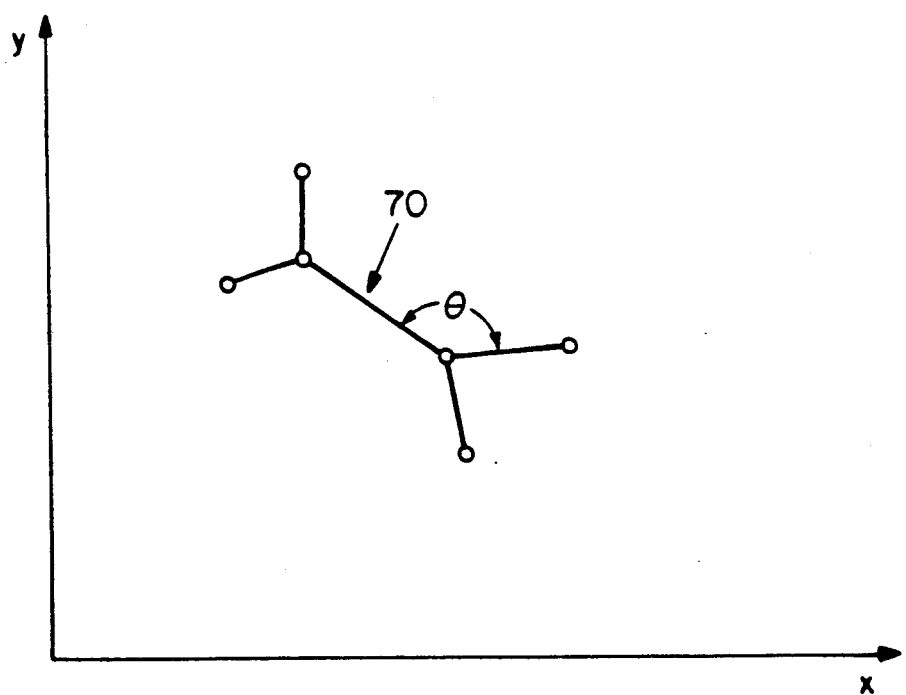
FIG. 4 is a schematic representation of the molecular bond of FIG. 3.

FIGS. 3 and 4 illustrate the forces associated with a particular molecular bond. FIG. 3 represents the bond energy curve associated with the rotation position of a selected molecular bond 70 of FIG. 4. At least the molecular structure of FIG. 4 is displayed by the computer. The energies in FIG. 3 are a summation of the Coulombic forces, the Hydrophilic forces, and the van der Waals forces. By having tactile, as well as visual, feedback in this docking maneuver, it is much easier for the researcher to find an inhibitor drug match for the enzyme molecule surface. A researcher can manipulate an inhibitor molecule relative to the enzyme surface until a proper interface is found. To facilitate finding a match throughout the molecule, disabling button 38 can be activated to position the docking molecule at a position other than the lowest energy state. Thus, further molecules can be added to the enzyme surface in an efficient pattern.

The preferred torque generated by the computer in response to changes of position about the molecular bond is a gradient effect. Thus, the torque is proportional to the slope of the energy curve at a given position. This provides the best tactile indicator of uphill and downhill positions on the energy curve. For example, points a, c, e, g, i, k, and m in FIG. 3 represent zero slope, and therefore, a minimal amount of torque. By contrast, points b, d, f, h, j, and 1 represent the higher slopes of both a positive and negative value. The sign of the slope provides an indication of the direction of the torque.

The user can pick any bond in the molecule and then rotate around that bond with the one dimensional computer interface device. As the user rotates around the bond, he can feel the change in computer generated resultant torque in the computer interface device. The energy function information of FIG. 3 can also be displayed on a window in the display screen. Thus, the conformal space of a molecule can be rapidly examined. The sense of touch can be used as a fast interactive method which supplements the sense of vision.

As noted above, the molecules can be manipulated in several fashions. The entire molecule can be twisted using the position sensor 54 on the glove 50 and 52. An individual bond in a given molecule can be manipulated. A small molecule can be matched with a larger molecule. It should be noted that all of the above can be accomplished using an otherwise standard workstation environment. A bond can be selected using the keyboard and that bond can be twisted using the one dimensional torque feedback computer interface device of the invention. As the user rotates the molecule around the bond, the computer input device provides feedback based on an estimate of the molecular forces. As noted above, the energy curve can be displayed on a screen along with the graphical display of the molecule. The torque on the joystick, as noted above, is proportional to the gradient of the energy curve.

In one application, the chemists may want to choose a bond, rotate it to the desired position, and then choose other bonds and rotate them as desired. In this example, it is important to have a mode where the force feedback is disabled. The chemist may want to leave the bond in a relatively high energy configuration. That could not be done if the force feedback is pushing the participant away from that position towards the local energy minimum. The disabling button 38 of computer input device 30 inactivates the torque feedback forces and allows bonds to be configured in a high energy level.

The resolution of this device can be varied. As will be noted below, the force feedback is quantized in five degree increments of the 360° rotation. By adding some interpolation where the energy is sampled, greater resolution and more presence can be obtained. The more samples taken, the more computing time required in the applications program. Thus, the resolution variation of the device is determined by the applications program and not the torque device.

Figure 5:
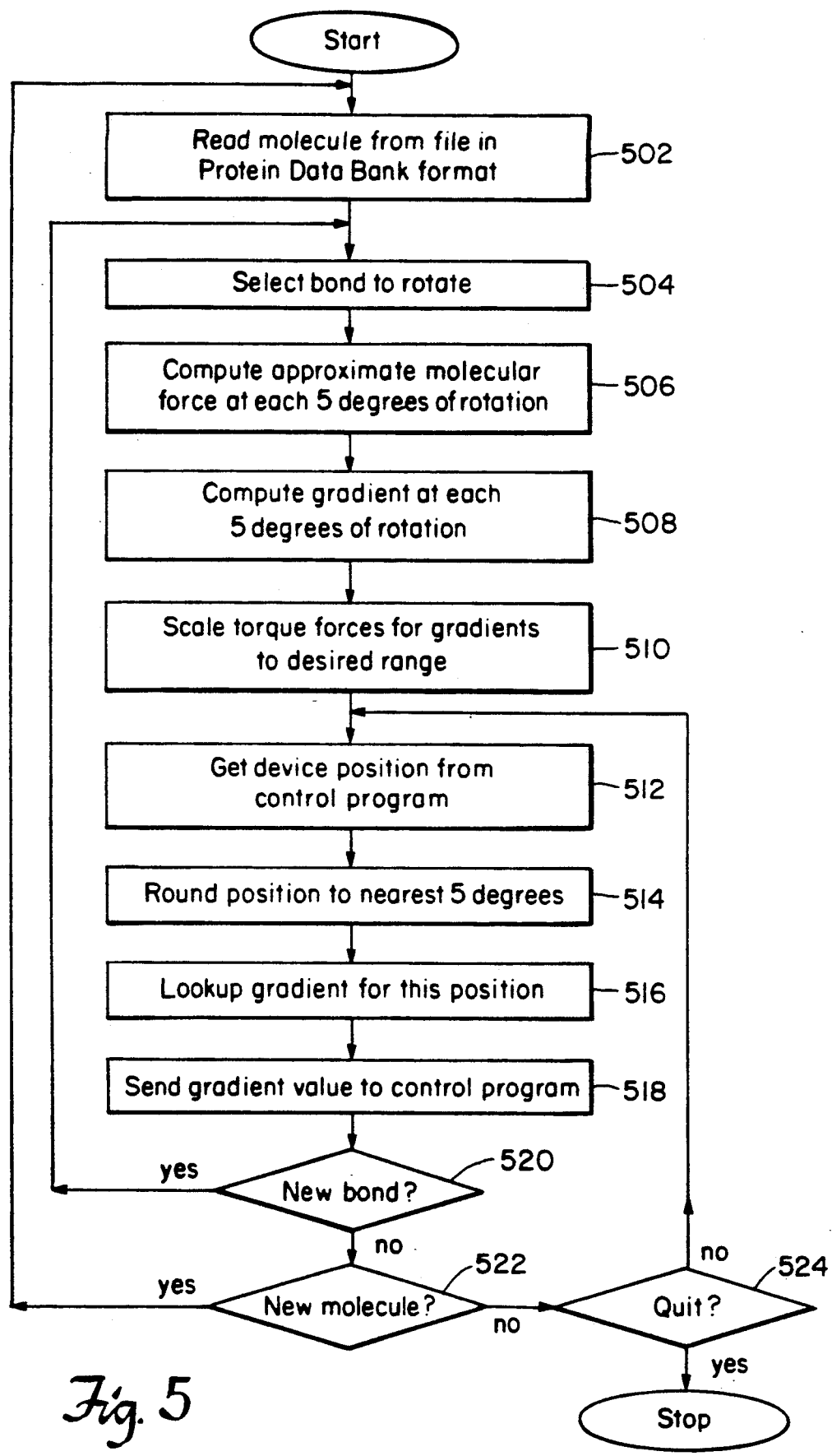
FIG. 5 illustrates an application program flow chart for molecular bond data.

FIG. 5 illustrates the flow chart for the application program for creating a computer generated molecular bond visual representation with tactile torque feedback. As shown in step 502, first the protein data bank format information for a particular molecule is read from a specific file. In step 504, a bond to be rotated is selected. Next, as shown in step 506, the molecular forces are computed at five degree increments and the gradients are computed at those positions as well in step 508. The torque forces are scaled to a desired range, as noted in step 510, and device position information is obtained from the control program for the device as noted in step 512. The device position is rounded to the nearest five degrees (see step 514), the gradient for this position is determined (see step 516), and that gradient value is transmitted to the control program (see step 518). The process can be reiterated for the same bond with movement of the shaft, from step 524 using the previously computed force data. If a new bond is selected at step 520, the force data must be recomputed. If a new molecule is selected at 522, a new data base must be selected at 502 and the forces then computed.

Figure 6:
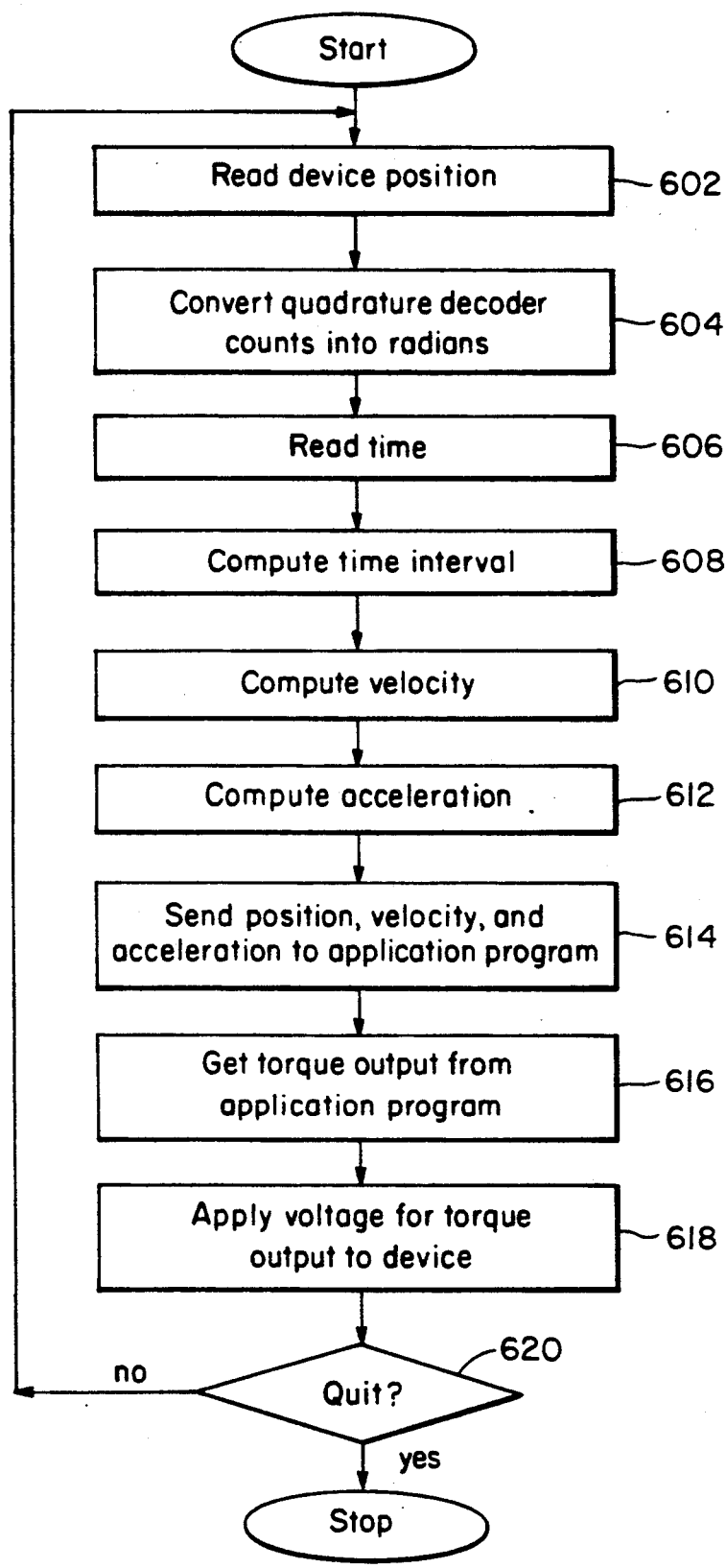
FIG. 6 illustrates a control program flow chart for the computer interface device of the invention.

The flow chart of FIG. 5 represents a molecular modelling prototype program which is run in parallel fashion with the general purpose device control program of FIG. 6. Typically, these two programs are communicating parallel processes. The programs are easily adapted so that the control program is a subroutine of the application program running on the same computer. However, the application program can run on the computer as the control program runs on an interface board or a different computer.

The computer control program flow-chart of FIG. 6 serves as a device driver. Initially, the device position is read as noted in step 602. The device position as indicated by a quadrature encoder is converted into radians (see step 604). The time is read (see step 606), the time interval is computed (see step 608), and velocity, as well as acceleration, are computed (see steps 610, 612). The position, velocity, and acceleration information are transmitted to the application program (see step 614), which calculates the torque output for a given device position (FIG. 6) and returns the torque output to the controller (see step 616). Finally, the voltage for a given torque output is applied to the device (see step 618). The process continues until a "quit" command is given (see step 620).

EQUIVALENTS

Those skilled in the art will recognize, or be able to ascertain, using no more than routine experimentation, many equivalents to the specific embodiments of the invention described herein. For example the button 38 may be positioned on the housing to avoid interference with operation of the shaft 36. Further, the preferred device is a one-dimensional, i.e. rotational, device.

Figure 7:
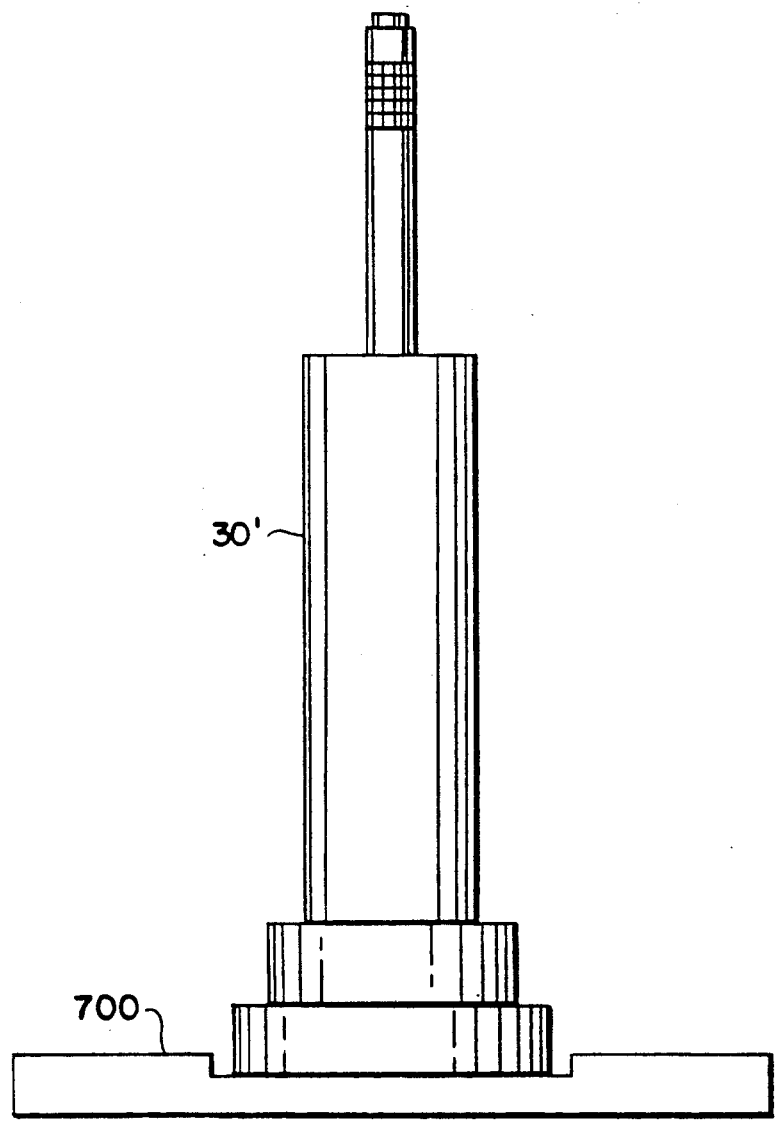
FIG. 7 illustrates the torque feedback computer interface device mounted on an otherwise conventional joystick.

However, the torque motor and shaft may be configured as the shaft of a conventional joystick. Such a configuration is shown in FIG. 7, wherein an interface device 30' is shown mounted on an otherwise conventional joystick 700. Thus, the shaft could be manipulated as a joystick to manipulate the display and the shaft could be twisted for rotational manipulation and torque feedback. Torque feedback should not be provided in the X-Y manipulation dimensions, however. The required torque motors would make the device too cumbersome for hand held manipulation.

The computer interface device of the invention can be used by the disabled. The device can be controlled by a body part other than the hand. For example, the foot or elbow can be used to manipulate the shaft to transmit position information and receive tactile torque feedback information. The shaft can also be manipulated by a prosthetic device.

These and all other equivalents are intended to be encompassed by the following claims.

We claim:

1. A computer input device comprising:
   a motor in a hand held housing;
   a shaft, extending from the motor to be rotated by hand and to provide torque to a user's hand;
   a position indicator for providing an output to a computer indicative of shaft rotational position relative to the motor; and
   an input to the motor for controlling torque applied to the shaft by the motor from a computer output.

2. A device, as recited in claim 1, wherein the position indicator is a quadrature encoder.

3. A device, as recited in claim 1, further comprising a disabling button, on the shaft, which disables the torque applied to the shaft.

4. A method of generating tactile torque feedback comprising:
   (a) rotating a shaft connected to a hand held torque motor;
   (b) generating a position signal in accordance with the shaft rotation; and
   (c) controlling the torque motor in accordance with the position signal to generate a tactile feedback signal on the shaft.

5. A computer interface system comprising:
   (a) a portable torque feedback device including:
       (i) a torque motor with an input;
       (ii) a rotatable shaft connected to the torque motor;
       (iii) a rotary position indicator, connected to the torque motor, for generating a position signal in accordance with the shaft rotation; and
   (b) a controller including:
       (i) circuitry for generating an output including a timing signal and the position signal;
       (ii) circuitry for transmitting the position and timing signals to a computer and to receive a digital tactile signal from the computer;
       (iii) a digital to analog converter for processing the tactile signal; and
       (iv) an amplifier for coupling the processed tactile signal from the converter to the torque motor input, so that a tactile torque feedback signal is applied to the torque motor.

6. A system, as recited in claim 5, wherein the rotary position indicator is a quadrature encoder.

7. A system, as recited in claim 5, wherein the tactile torque feedback signal represents a gradient.

8. A system, as recited in claim 5, further comprising a disabling button, on the shaft, which disables the tactile torque feedback signal.

9. A system, as recited in claim 5, wherein the torque feedback device is mounted on a joystick.

10. A system, as recited in claim 5, wherein the computer processes the position and timing signals and generates signals representing velocity and acceleration of the shaft.

11. A system for providing visual and tactile feedback comprising:
    (a) a computer for storing and manipulating visual and tactile data;
    (b) a display device, connected to the computer, for displaying visual data;
    (c) a selector for selecting particular portions of the visual display to be manipulated; and
    (d) a portable, torque feedback device including
        (i) a torque motor with an input;
        (ii) a rotatable shaft connected to the torque motor;
        (iii) a rotary position indicator, connected to the torque motor, for generating and forwarding to the computer a position signal in accordance with the shaft rotation so that a tactile torque feedback signal is developed by the computer and transmitted to the torque motor input.

12. A system, as recited in claim 11, further comprising:
    a controller including
        (i) circuitry for generating an output including a timing signal and the position signal;
        (ii) circuitry for transmitting position and timing signals to the computer and to receive a digital tactile signal from the computer;
        (iii) a digital to analog converter for processing the tactile signal; and
        (iv) an amplifier for coupling the processed tactile signal from the converter to the torque motor input, so that a tactile torque feedback signal is applied to the torque motor.

13. A system, as recited in claim 12, wherein the rotary position indicator is a quadrature encoder.

14. A system, as recited in claim 12, wherein the tactile torque feedback signal represents a gradient.

15. A system, as recited in claim 12, further comprising a disabling button, on the shaft, which disables the tactile torque feedback signal.

16. A method of generating visual and tactile feedback comprising:
    (a) storing visual and tactile data;
    (b) displaying the visual data;
    (c) selecting a portion of the visual display to be manipulated;
    (d) rotating a shaft connected to a hand held torque motor;
    (e) generating a position signal in accordance with the shaft rotation;
    (f) manipulating the visual data in accordance with the position signal; and
    (g) controlling the torque motor in accordance with the position signal to generate a tactile feedback signal on the shaft.

17. A system for providing visual and tactile feedback comprising:
    (a) a computer for storing and manipulating visual and tactile data;
    (b) a display device, connected to the computer, for displaying visual data;

(c) a selector for selecting particular portions of the visual display to be manipulated;

(d) a torque feedback device including
   (i) a torque motor with an input;
   (ii) a rotatable shaft torque motor;
   (iii) a rotary position indicator, connected to the torque motor, for generating and forwarding to the computer a position signal in accordance with the shaft rotation so that a tactile torque feedback signal is developed by the computer and transmitted to the torque motor input, and (e) a controller including
   (i) circuitry for generating an output including a timing signal and the position signal;
   (ii) circuitry for transmitting position and timing signals to the computer and to receive a digital tactile signal from the computer;
   (iii) a digital to analog converter for processing the tactile signal; and
   (iv) an amplifier for coupling the processed tactile signal from the converter to the torque motor input, so that a tactile torque feedback signal is applied to the torque motor.

18. A system for simulating molecular bond data comprising:
   (a) a computer format data and generating visual and tactile torque feedback information for a molecule;
   (b) a display device connected to the computer, for displaying the molecule;
   (c) a positioning device connected to the computer, for generating spatial information so that a particular molecular bond can be selected for manipulation;
   (d) a feedback device including:
      (i) a torque motor with an input;
      (ii) a rotatable shaft connected to the torque motor;
      (iii) a rotary position indicator, connected to the torque motor, for generating a position signal for a selected molecular bond, in accordance with the shaft rotation so that a tactile torque feedback signal is developed and transmitted to the torque motor input; and
   (e) a controller including:
      (i) circuitry for generating an output including a timing signal and the position signal;
      (ii) circuitry for transmitting the position and timing signals to the computer and receiving a molecular bond tactile digital signal from the computer;
      (iii) a digital to analog converter for converting the tactile digital signal into a tactile analog signal; and
      (iv) an amplifier for coupling the processed tactile signal from the converter to the torque motor input, so that the tactile torque feedback signal is applied to the torque motor, wherein a particular molecular bond can be manipulated, visualized, and the torque of the resultant molecular forces can be felt by the user.

19. A system, as recited in claim 18, wherein the display device is adapted to be worn on a user's head.

20. A system, as recited in claim 19, wherein the positioning device is glove shaped and adapted to be worn on a user's hands.

21. A system, as recited in claim 18, wherein the torque feedback device further comprises a disabling button on the shaft for disabling the tactile torque signal representing the molecular bond energy.

22. A system, as recited in claim 18, wherein the torque feedback device is portable.

23. A system, as recited in claim 18, wherein the molecular bond format data is Protein Data Bank format data.

24. A system, as recited in claim 18, wherein the positioning device is mounted on the feedback device.

25. A system for simulating molecular bond data comprising:
   (a) a computer for storing and manipulating visual and tactile data associated with a plurality of molecular bonds;
   (b) a display device, connected to the computer, for displaying molecular bond data;
   (c) a selector for selecting particular molecular bonds to be manipulated; and
   (d) a torque feedback device including
      (i) a torque motor with an input;
      (ii) a rotatable shaft connected to the torque motor;
      (iii) a rotary position indicator connected to the torque motor, for generating and forwarding to the computer a position signal in accordance with the shaft rotation so that a tactile torque feedback signal is developed by the computer and transmitted to the torque motor input, wherein a particular molecular bond can be manipulated, visualized, and the torque of the resultant molecular forces can be felt by the user.

26. A method for simulating molecular bond data comprising:
   (a) storing and manipulating visual and tactile data associated with a plurality of molecular bonds;
   (b) displaying molecular bond data;
   (c) selecting a particular molecular bond to be manipulated;
   (d) rotating a shaft connected to a hand held torque motor;
   (e) generating a position signal in accordance with the shaft rotation;
   (f) manipulating the molecular bond visual data in accordance with the position signal; and
   (g) controlling the torque motor in accordance with the position signal to generate a tactile feedback signal on the shaft, wherein a particular molecular bond can be manipulated, visualized, and the torque of the resultant molecular forces can be felt by the user.

27. A computer interface device comprising:
   a motor to generate torque in response to a computer-controlled signal appearing on an input;
   a shaft extending from the motor to be rotated by a user and to transfer torque from the motor to the user; and
   a position indicator to provide to a computer an indication of the rotational position of the shaft.

28. A device as recited in claim 27 wherein the shaft is to be operated by a user's hand.

29. A device as recited in claim 27, further comprising a housing to enable said device to be held in a user's hand.

30. A device as recited in claim 27 wherein the position indicator is a quadrature encoder.

31. A device as recited in claim 27, further comprising a disabling button on the shaft to disable the torque applied to the shaft.

* * * * *